US011150836B2

(12) United States Patent
Williams et al.

(10) Patent No.: US 11,150,836 B2
(45) Date of Patent: Oct. 19, 2021

(54) DETERMINISTIC OPTIMIZATION VIA PERFORMANCE TRACKING IN A DATA STORAGE SYSTEM

(71) Applicant: Seagate Technology LLC, Cupertino, CA (US)

(72) Inventors: Steven S. Williams, Longmont, CO (US); Stacey Secatch, Niwot, CO (US); David W. Claude, Loveland, CO (US); Kyumsung Lee, Louisville, CO (US); Benjamin J. Scott, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/021,782

(22) Filed: Jun. 28, 2018

(65) Prior Publication Data
US 2020/0004456 A1 Jan. 2, 2020

(51) Int. Cl.
*G06F 3/06* (2006.01)
*G06F 9/38* (2018.01)

(52) U.S. Cl.
CPC .......... *G06F 3/0659* (2013.01); *G06F 3/0611* (2013.01); *G06F 3/0653* (2013.01); *G06F 3/0679* (2013.01); *G06F 9/3855* (2013.01)

(58) Field of Classification Search
CPC ......... G06F 3/061–0613; G06F 3/0659; G06F 9/3855; G06F 12/00–16; G06F 13/1642
See application file for complete search history.

(56) References Cited

U.S. PATENT DOCUMENTS

| 6,148,394 | A | 11/2000 | Tung et al. |
| 7,711,788 | B2 | 5/2010 | Lev Ran et al. |
| 8,171,242 | B2 | 5/2012 | Hong |
| 8,423,722 | B1 | 4/2013 | Deforest et al. |
| 9,032,177 | B2 | 5/2015 | Alcantara et al. |
| 9,354,884 | B2 | 5/2016 | Comparan et al. |
| 10,168,953 | B1* | 1/2019 | Gupta ................... G06F 3/0605 |
| 10,387,340 | B1* | 8/2019 | Baryudin ............... G06F 3/064 |
| 2007/0121499 | A1 | 5/2007 | Pal et al. |
| 2018/0081749 | A1* | 3/2018 | Resch .................. G06F 11/0727 |
| 2018/0188970 | A1* | 7/2018 | Liu ........................ G06F 3/0611 |

* cited by examiner

*Primary Examiner* — Nicholas J Simonetti
(74) *Attorney, Agent, or Firm* — Hall Estill Law Firm

(57) ABSTRACT

A semiconductor data storage memory can receive data access commands into a queue in a first time sequence that correspond with the transfer of data between a host and portions of the memory. The memory may be divided into separate portions that each have a different owner and the access commands may be issued to each of the respective separate portions. The access commands can subsequently be executed in a different, second time sequence responsive to estimated completion times for each of the access commands based on measured completion times for previously serviced, similar commands to maintain a nominally consistent quality of service level for each of the respective owners.

20 Claims, 7 Drawing Sheets

DETERMINISTIC OPTIMIZATION VIA PERFORMANCE TRACKING IN A DATA STORAGE SYSTEM

SUMMARY

Various embodiments of the present disclosure are generally directed to the management of operations in a memory, such as, but not limited to, a flash memory in a solid state drive (SSD).

A data storage semiconductor memory, in some embodiments, has an accumulated list in a memory of background operations to be carried out upon a semiconductor memory formed of one or more non-volatile memory dies. When a deterministic window interval is entered responsive to a request from a host during which data transfers between the host and the semiconductor memory meet a minimum predetermined data transfer rate, the accumulated list is sorted into a first set of the background operations that can be performed during the deterministic window interval while maintaining the minimum predetermined data transfer rate and a remaining second set of the background operations. The first set of the background operations is performed during the deterministic window interval prior to the second set of background operations being performed after a conclusion of the deterministic window interval.

These and other features which may characterize various embodiments can be understood in view of the following detailed discussion and the accompanying drawings.

DETAILED DESCRIPTION

Figure 1:
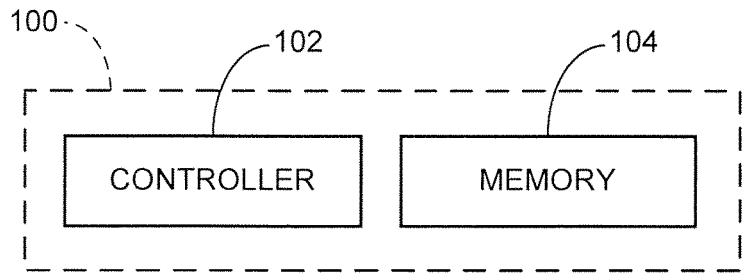
FIG. 1 provides a functional block representation of a data storage device in accordance with various embodiments.

Without limitation, the various embodiments disclosed herein are generally directed to managing data access and data maintenance operations in one or more data storage devices of a data storage system to provide consistent data read latency in a deterministic window.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into die sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. One example is an 8 lane/128 die configuration, with each lane connected to 16 dies. The dies are further subdivided into planes, GCUs, erasure blocks, pages, etc. Groups of dies may be arranged into separate NVMe sets, or namespaces. This allows the various die sets to be concurrently serviced for different owners (users). An die device generally carries out three (3) main operations: (1) hot data transfers during which user data sets are written to or read from the flash memory; (2) cold data transfers during which the device carries out garbage collection and other operations to free up memory for the storage of new data; and (3) map updates in which snapshots and journals are accumulated and written to maintain an up-to-date system map of the memory locations in which data sets are stored.

The NVMe Specification allows a data storage device to periodically enter a deterministic window (DW) during which certain operational performance is guaranteed, such as guaranteed data delivery without retransmission. The specification is not clear on exactly how long the DW is required to last, or by what metrics the device can be measured. One example of a DW performance is that X number of reads can be carried out at a certain minimum data transfer rate; another is that so many blocks may be written to completion within a particular period of time. It is contemplated that a user can declare a DW at substantially any given time, and it is not usually known when a DW will be declared. There is a non-deterministic window (NDW) that will occur after each DW to allow the device to recover and carry out background operations, etc.

A problem arises when insufficient time is available to perform a given task, such as a data read or data write command for a given die set. In an input/output determinism (IOD) environment, it is desirable to ensure that all owners are provided reliable quality of service performance levels at a deterministic rate. Accordingly, embodiments are directed to optimizing I/O by keeping a running estimation of allocated work per resource, such as how much time it takes to perform a write, a read, etc., to choose which work task to perform next. Generally, embodiments maintain estimates of time required to perform certain tasks, and deciding whether we can do something else within a given time slot. Such considerations can be customized to DW intervals so that data access commands and/or background tasks are executed based on reliable estimations of how long execution will take, which can optimize the data read performance consistency during a DW interval.

Reliable prediction of how long a task will take to execute may involve gathering and maintaining background metrics on actual tasks that have been performed. The collected execution data can be placed into buckets or other groupings based on different scenarios, such as high, medium, or low utilization times. From this, a data storage system can estimate how much time a given task can realistically take, and schedules tasks, and/or alter task priority, as needed to obtain optimum throughput for all owners. Minimum rates of I/O can be established for certain NDW and DW intervals with priority given as required to ensure the data storage system provides consistent performance to each connected host.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices network server, network node, or remote controller.

Figure 2:
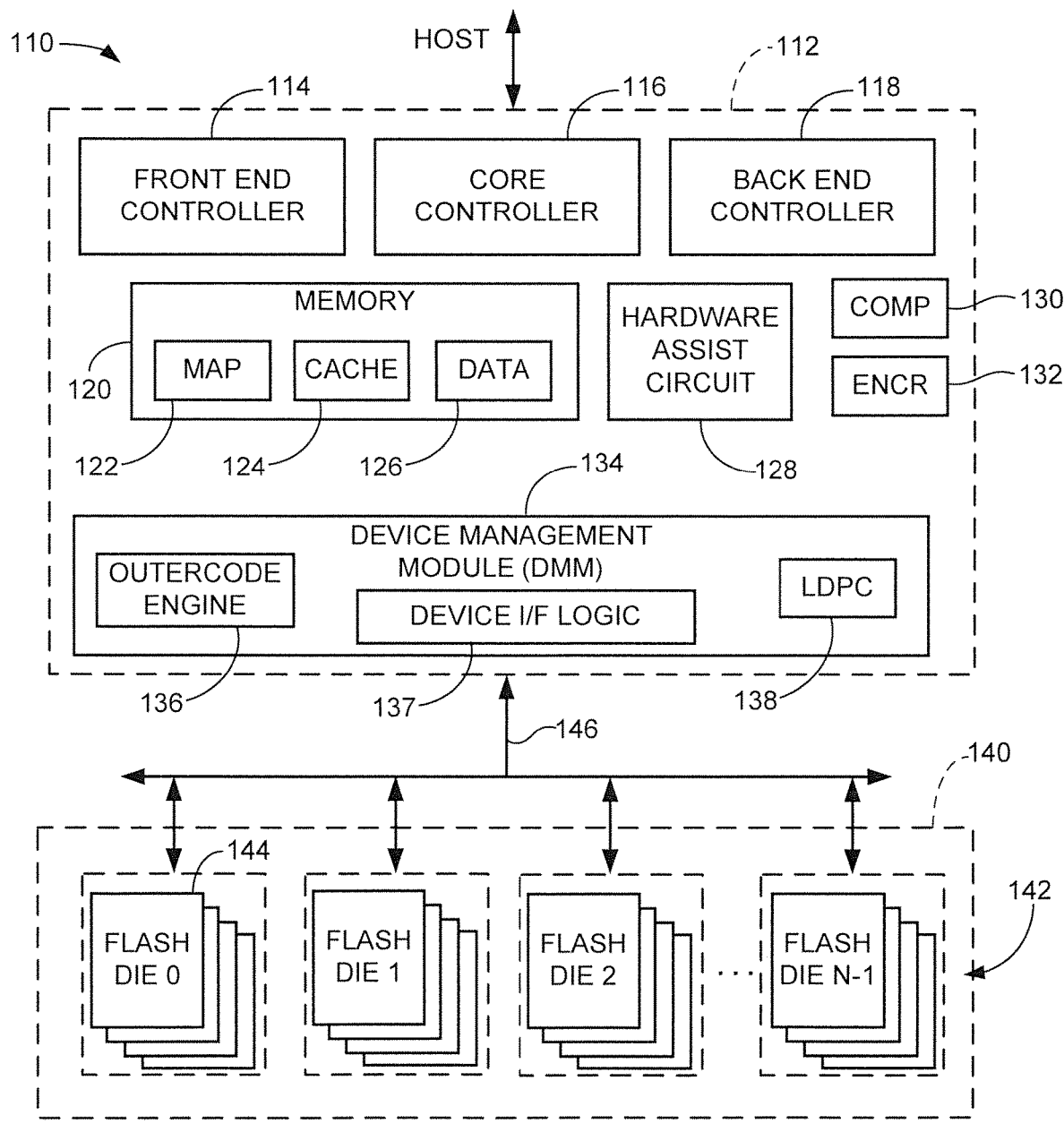
FIG. 2 shows aspects of the device of FIG. 1 characterized as a solid state drive (SSD) in accordance with some embodiments.

FIG. 2 displays an example data storage device 110 generally corresponding to the device 100 in FIG. 1. The device 110 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate die sets for use in the storage of data. Each die set may form a portion of an NVMe Namespace that may span multiple SSDs or be contained within a single SSD.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via one or more channels (lanes) 146.

Figure 3:
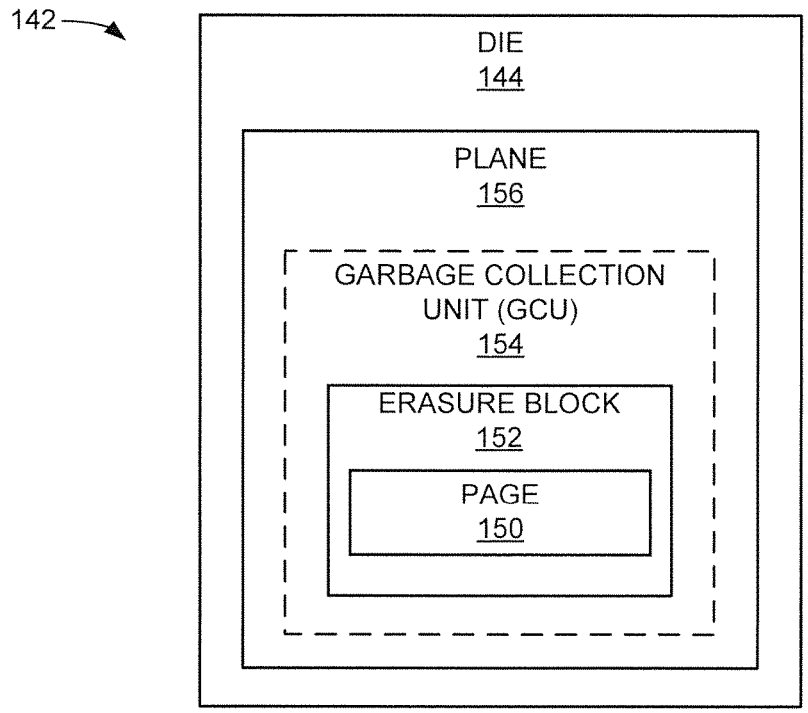
FIG. 3 is an arrangement of the flash memory of FIG. 2 in some embodiments.

FIG. 3 shows an arrangement of the various flash memory dies 144 in the flash memory 142 of FIG. 2 in some embodiments. Other configurations can be used. The smallest unit of memory that can be accessed at a time is referred to as a page 150. A page may be formed using a number of flash memory cells that share a common word line. The storage size of a page can vary; current generation flash memory pages can store, in some cases, 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical structures that utilize erasure blocks that are selected from different dies. GCUs are allocated and erased as a unit. In some embodiments, a GCU may be formed by selecting one or more erasure blocks from each of a population of dies so that the GCU spans the population of dies.

Each die 144 may include a plurality of planes 156. Examples include two planes per die, four planes per die, etc. although other arrangements can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
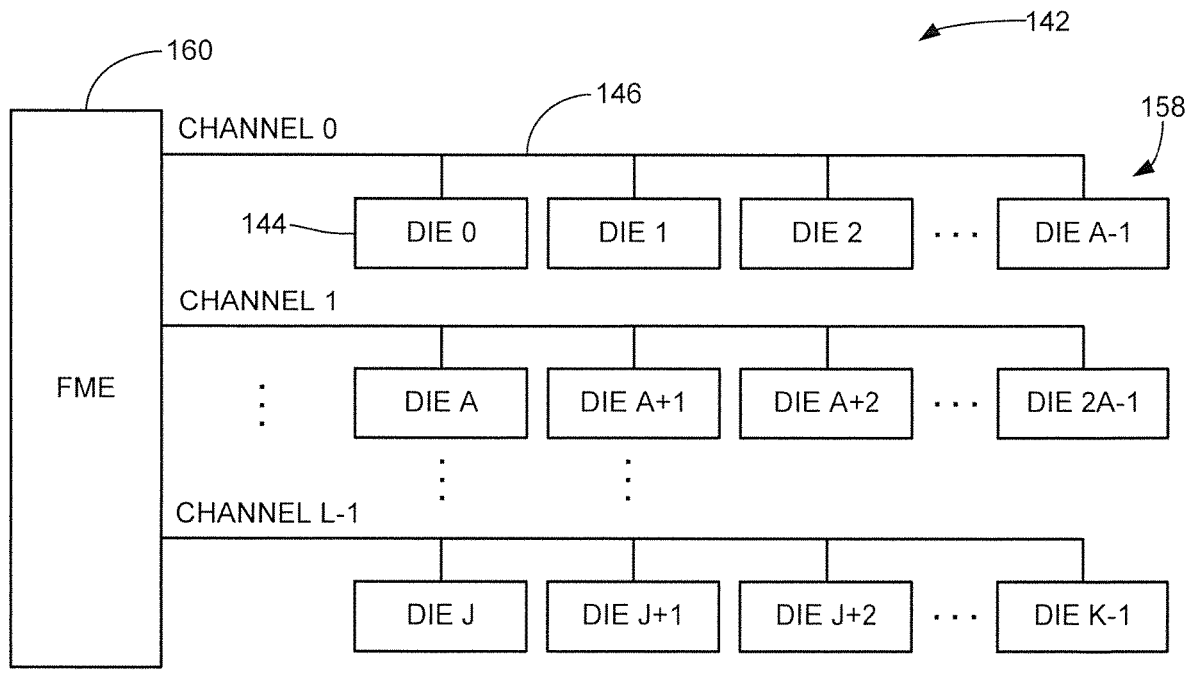
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 160 of the flash memory module 142 controls each of the channels 146 to transfer data to and from the dies 144.

In some embodiments, the various dies are arranged into one or more die sets. A die set represents a portion of the storage capacity of the SSD that is allocated for use by a particular host (user/owner). Die sets are usually established with a granularity at the die level, so that some percentage of the total available dies 144 will be allocated for incorporation into a given die set.

A first example die set is denoted at 162 in FIG. 4. This first set 162 uses a single die 144 from each of the different channels 146. This arrangement provides fast performance during the servicing of data transfer commands for the set since all eight channels 146 are used to transfer the associated data. A limitation with this approach is that if the set 162 is being serviced, no other die sets can be serviced during that time interval. While the set 162 only uses a single die from each channel, the set could also be configured to use multiple dies from each channel, such as 16 dies/channel, 32 dies/channel, etc.

A second example die set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple die sets at the same time, provided the sets do not share the same (e.g., an overlapping) channel 146.

Figure 5:
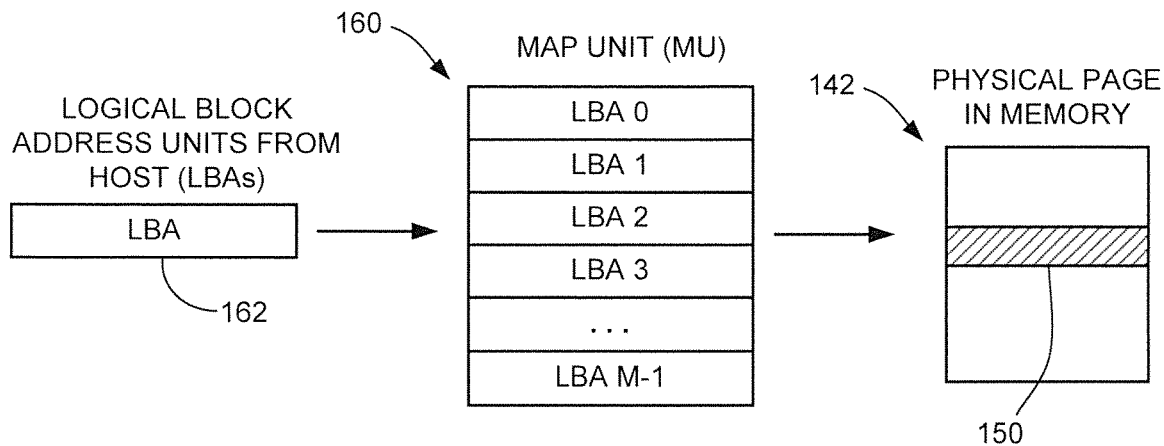
FIG. 5 represents a map unit (MU) as a data arrangement stored to the flash memory of FIG. 2.

FIG. 5 illustrates a manner in which data may be stored to the flash memory module 142. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024 B (1 KB), etc., and the MUs 170 may have a second nominal size, such as 4096 B (4 KB), etc. The application of data compression may cause each MU to have a smaller size in terms of actual bits written to the flash memory 142.

The MUs 170 are arranged into the aforementioned pages 150 (FIG. 3) which are written to the memory 142. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 170) to enable the SSD 110 to locate the physical location of existing data. For example, during the servicing of a read command it is generally necessary to locate the physical address within the flash memory 144 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
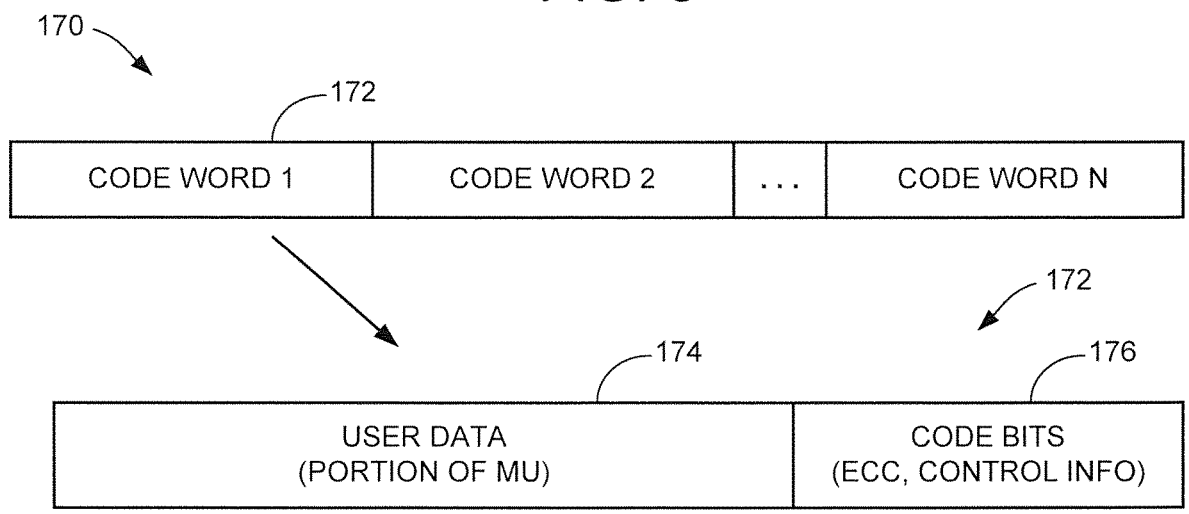
FIG. 6 shows a functional block diagram for a GCU management circuit of the SSD in accordance with some embodiments.

FIG. 6 shows a functional block diagram for a GCU management circuit 180 of the SSD 110 in accordance with some embodiments. The circuit 180 may form a portion of the controller 112 and may be realized using hardware circuitry and/or one or more programmable processor circuits with associated firmware in memory. The circuit 180 includes the use of a forward map 182 and a reverse directory 184. As noted above, the forward map and reverse directory are metadata data structures that describe the locations of the data blocks in the flash memory 142. During the servicing of host data transfer operations, as well as other operations, the respective portions of these data structures are located in the flash memory or other non-volatile memory location and copied to local memory 120 (see e.g., FIG. 2).

The forward map 182 provides a flash transition layer (FTL) to generally provide a correlation between the logical addresses of various blocks (e.g., MUAs) and the physical addresses at which the various blocks are stored (e.g., die set, die, plane, GCU, EB, page, bit offset, etc.). The contents of the forward map 182 may be stored in specially configured and designated GCUs in each die set.

The reverse directory 184 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 180 further includes a map integrity control circuit 186. As explained below, this control circuit 186 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 188. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 186 find a mismatch between the forward map 182 and the reverse directory 184 for a given GCU, the control circuit 186 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 182 indicates that there should be some number X valid blocks in the selected GCU, such as 12 valid blocks, but the reverse directory 184 indicates that there are only Y valid blocks, such as 11 valid blocks, and the 11 valid blocks indicated by the reverse directory 184 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 190 may be formed as a data structure in memory of GCUs that have been found to require further evaluation. In this way, the GCUs can be evaluated later at an appropriate time for resolution, after which the corrected GCUs can be placed on the verified list in the TOVG 188.

It will be noted that the foregoing operation of the control circuit 186 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 180 to include a garbage collection scheduler circuit 192. This circuit 192 generally operates once it is appropriate to consider performing a garbage collection operation, at which point the circuit 192 selects from among the available verified GCUs from the table 188. In some cases, the circuit 192 may generate a time of completion estimate to complete the garbage collection operation based on the size of the GCU, the amount of data to be relocated, etc.

As will be appreciated, a garbage collection operation can include accessing the forward map and/or reverse directory 182, 184 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
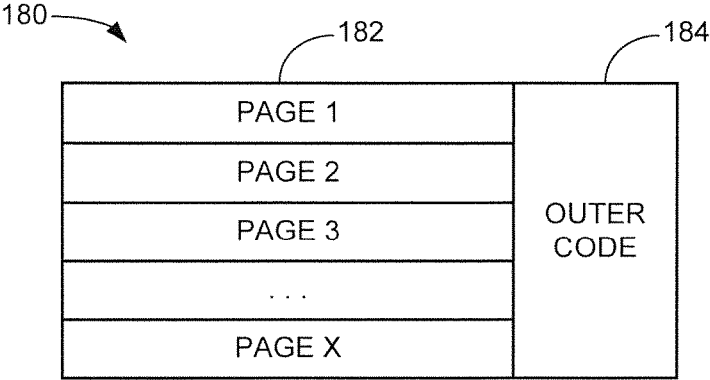
FIG. 7 illustrates an arrangement of various GCUs and corresponding tables of verified GCUs (TOVGs) for a number of different die sets in some embodiments.

FIG. 7 shows a number of die sets 200 that may be arranged across the SSD 110 in some embodiments. Each set 200 may have the same nominal data storage capacity (e.g., the same number of allocated dies, etc.), or each may have a different storage capacity. The storage capacity of each die set 200 is arranged into a number of GCUs 154 as shown. In addition, a separate TOVG (table of verified GCUs) 188 may be maintained by and in each die set 200 to show the status of the respective GCUs. From this, each time that it becomes desirable to schedule a garbage collection operation, such as to free up new available memory for a given set, the table 188 can be consulted to select a GCU that, with a high degree of probability, can be subjected to an efficient garbage collection operation without any unexpected delays due to mismatches in the metadata (forward map and reverse directory).

Figure 8:
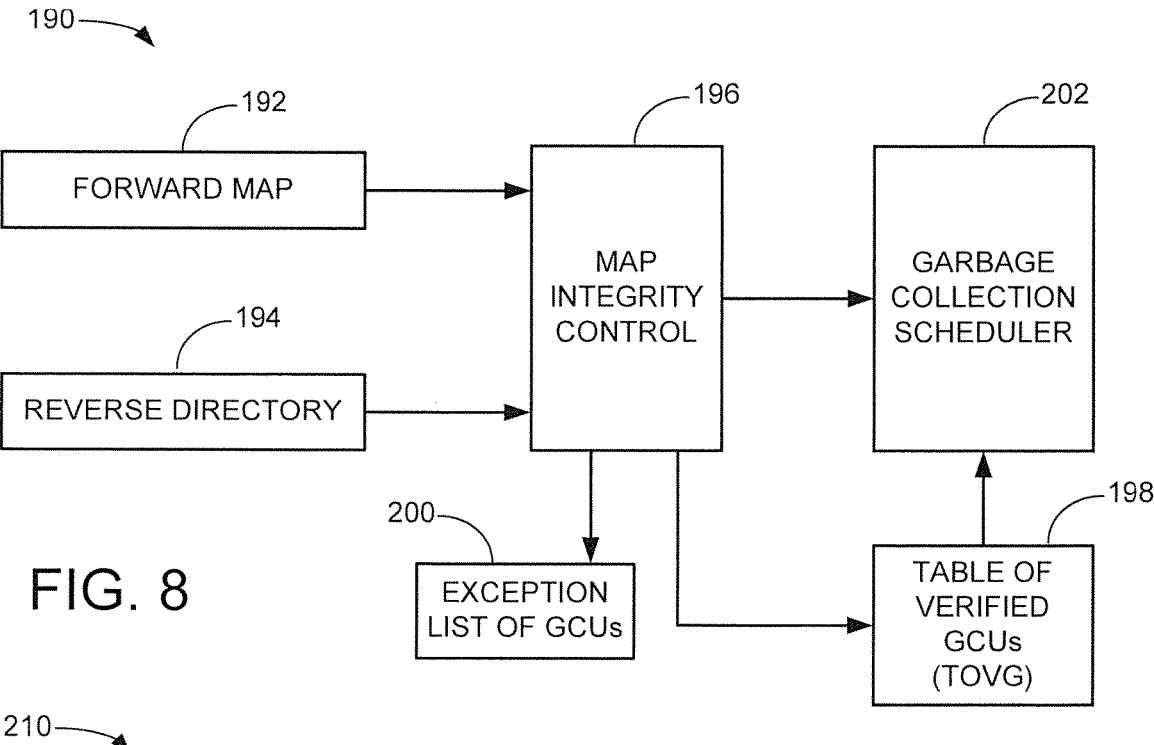
FIG. 8 displays a functional block diagram for a GCU management circuit of the SSD in accordance with some embodiments.

FIG. 8 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 9:
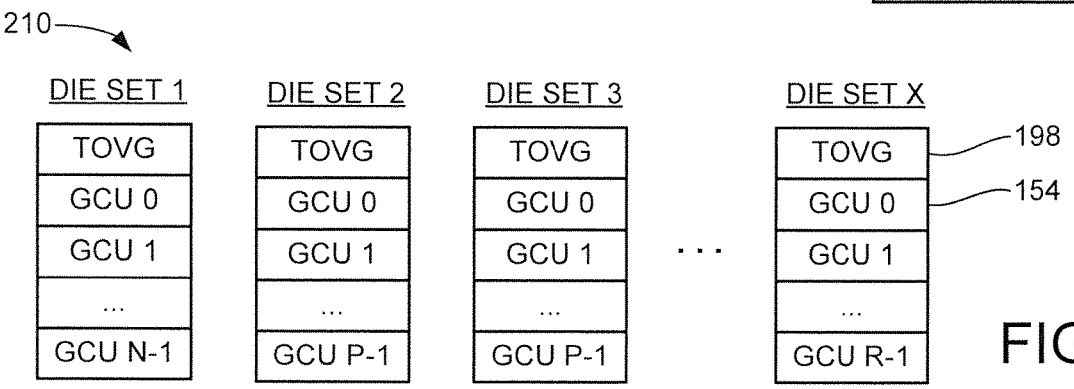
FIG. 9 depicts an arrangement of various GCUs and corresponding tables of verified GCUs (TOVGs) for a number of different die sets in some embodiments.

FIG. 9 shows a number of die sets 210 that may be arranged across the SSD 110 in some embodiments. Each set 210 may have the same nominal data storage capacity (e.g., the same number of allocated dies, etc.), or each may have a different storage capacity. The storage capacity of each die set 210 is arranged into a number of GCUs 154 as shown. In addition, a separate TOVG (table of verified GCUs) 198 may be maintained by and in each die set 210 to show the status of the respective GCUs. From this, each time that it becomes desirable to schedule a garbage collection operation, such as to free up new available memory for a given set, the table 198 can be consulted to select a GCU that, with a high degree of probability, can be subjected to an efficient garbage collection operation without any unexpected delays due to mismatches in the metadata (forward map and reverse directory).

Figure 10:
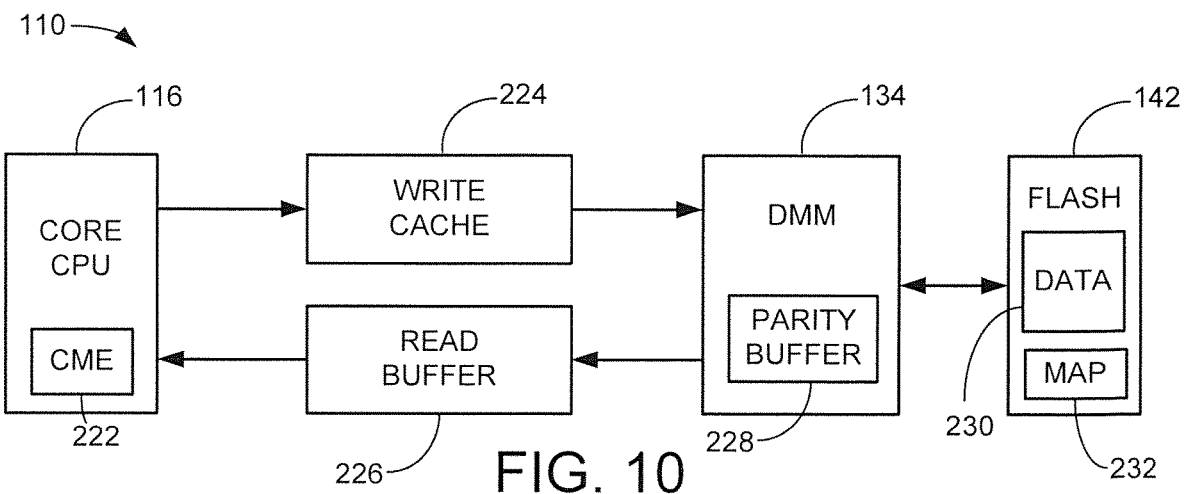
FIG. 10 illustrates an example data set that can be written to the data storage device of FIG. 1 in accordance with assorted embodiments.

FIG. 10 shows a functional block representation of additional aspects of the SSD 110. The core CPU 116 from FIG. 2 is shown in conjunction with a code management engine (CME) 222 that can be used to manage the generation of the respective code words and outer code parity values for both standard and non-standard parity data sets During write operations, input write data from the associated host are received and processed to form MUs 160 (FIG. 3) which are placed into a non-volatile write cache 224 which may be flash memory or other form(s) of non-volatile memory. The MUs are transferred to the DMM circuit 134 for writing to the flash memory 142 in the form of code words 172 as described above. During read operations, one or more pages of data are retrieved to a volatile read buffer 226 for processing prior to transfer to the host.

The CME 222 determines the appropriate inner and outer code rates for the data generated and stored to memory. In some embodiments, the DMM circuit 134 may generate both the inner and outer codes. In other embodiments, the DMM circuit 134 generates the inner codes (see e.g., LDPC circuit 146 in FIG. 2) and the core CPU 116 generates the outer code words. In still other embodiments, the same processor/controller circuit generates both forms of code words. Other arrangements can be used as well. The CME 222 establishes appropriate code rates for both types of code words.

During generation of the outer codes, a parity buffer 218 may be used to successively XOR each payload being written during each pass through the dies. Both payload data 230 and map data 232 will be stored to flash 142.

Figure 11:
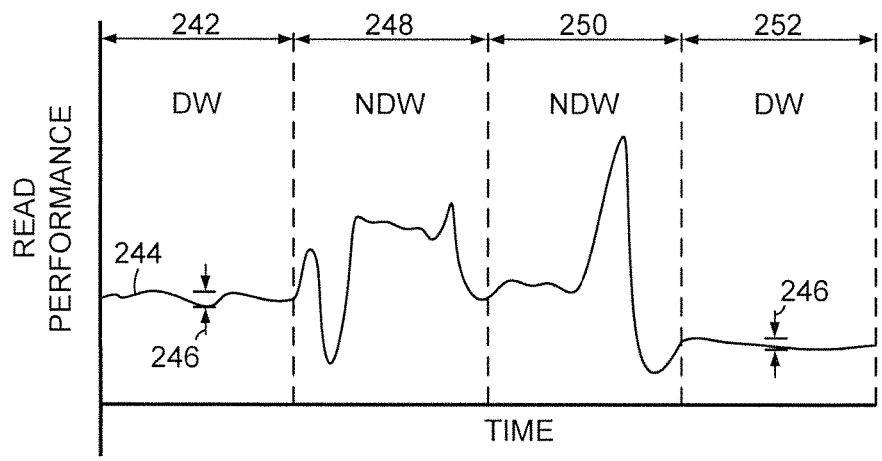
FIG. 11 plots operational data for an example data storage system employing various embodiments of the present disclosure.

FIG. 11 plots example operational data for a data storage system configured and operated in accordance with various embodiments to improve data read performance during deterministic windows. As shown, read latency is charted over time involving deterministic window (DW) and non-deterministic window (NDW) intervals. During a first DW interval 242, read latency, as indicated by solid line 244, of a plurality of reads to different portions of a memory is maintained within a relatively tight range 246, which corresponds with data read consistency over time. It is contemplated that different data read performance metrics, such as error rate and overall time to return data to a host, can be used in substitution of, or in combination to, the read performance of FIG. 11 with similarly tight ranges 246, and approximately uniform consistency, of read performance being maintained.

The tight consistency of data reads during the DW can be, at least partially, contributed to background data maintenance operations and/or data writes being reduced or suspended. A DW interval is followed by one or more NDW intervals, such as interval 248, where pending data writes and background data maintenance operations are carried out along with data reads. The inherent behavior of data writes that involve data erases prior to programming data and data maintenance operations that involve varying volumes of processing, data reads, and data writes contribute to the variance of read latency The second NDW 250 shows how data accesses and data maintenance operations are not consistent and can be considered random compared to the tight range 246 of data latency performance the DW intervals 242 and 252. It is noted that the consistent performance for the first DW interval 242 is at a different latency value than the second DW interval 252. Hence, consistency is prioritized throughout a DW interval regardless of the latency value that is consistently provided to a host, even at the expense of providing less than the fastest possible read performance. In other words, predictable read latency, and performance, are emphasized during a DW interval even if that means providing higher read latency than possible.

Figure 12:
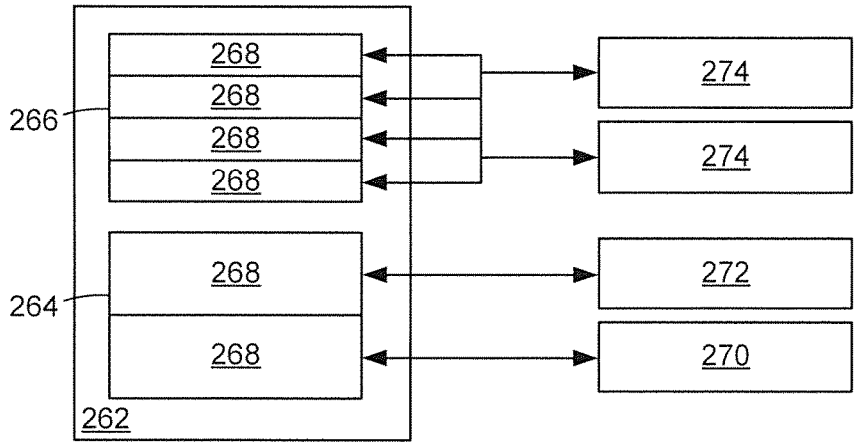
FIG. 12 conveys a block representation of an example data storage system in which various embodiments may be practiced.

FIG. 12 is a block representation of portions of an example data storage system 260 in which various embodiments may be practiced. The system 260 has at least one data storage device 262 in which memory die 264/266 are respectively housed. It is contemplated that the memory die 264/266 have one or more planes of memory cells providing any non-volatile capacity. Each memory die 264/266 is logically divided in separate die sets 248 that can be individually, and concurrently, accessed.

In the non-limiting example shown in FIG. 11, a first host 270 and a second host 272 are each connected to different, single die sets 268. Such host/die set configuration can be reliable with consistent performance metrics, such as data access latency, as long as the respective die sets 268 have available capacity to accommodate newly generated data. The connection of multiple different die sets 268 to multiple different hosts, as illustrated by remote hosts 274, can provide more robust data capacity and greater data access performance to multiple hosts 274 than the individual connections of hosts 270/272. However, the connection of multiple die sets 268 to multiple hosts can be challenging to provide consistent data access command performance due at least to encountered errors, conflicts, and different data priority levels.

The difficulties of providing consistent quality of data access service to hosts 274 can be exacerbated when one or more die sets 268 are in a DW interval where pending data writes and background operations, such as garbage collection, map updates, and memory cell refreshes, are minimized while data reads are executed with maximum possible performance consistency. For instance, if one die set 268 of a die 264 is in a DW interval while another die set 268 of the die 264 is in a NDW interval, the risk of data conflicts increases and the overhead processing necessary to service the DW interval requirements can degrade data accesses in the NDW interval die set(s) 268. Hence, various embodiments are directed to tracking the execution performance of memory tasks, such as access commands and background operations, to allow optimized pending task execution that adapts to changing system conditions, such as DW and NDW intervals.

Figure 13:
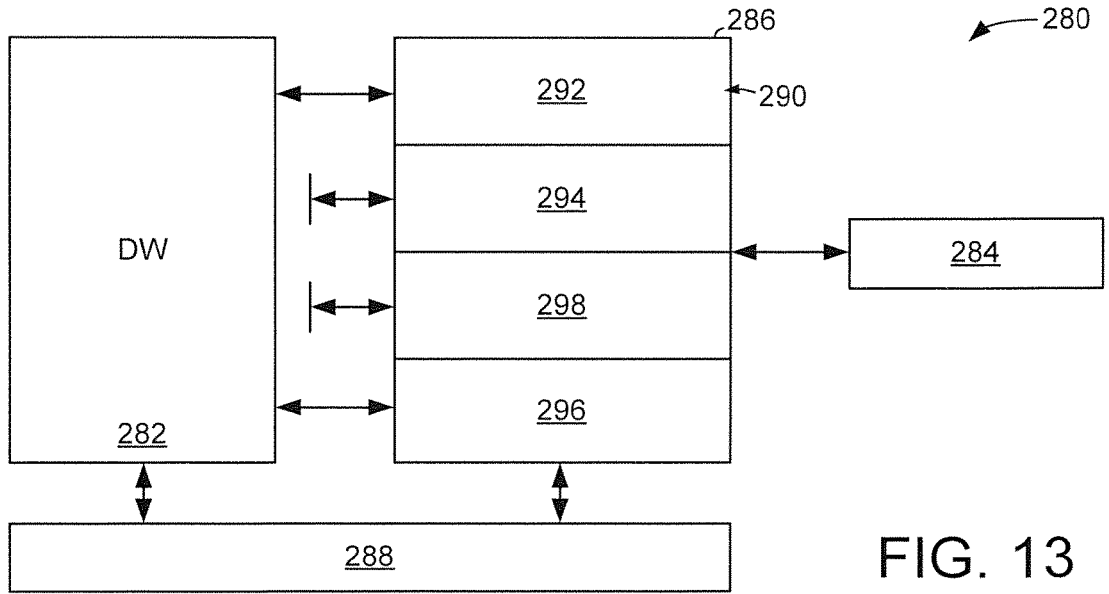
FIG. 13 represents portions of an example data storage system configured in accordance with various embodiments.

FIG. 13 displays a block representation of portions of another example data storage system 280 arranged in accordance with some embodiments. A die set 282 is shown connected to a remote host 284 via a queue 286. It is contemplated that multiple different hosts 284 and queues 286 can be concurrently connected to, and simultaneously access, the die set 282.

While in a DW interval, a system controller 288 can reorganize a queue 286 by moving, or prioritizing without moving, pending tasks 290, which can be any data access activity, such as data reads, data writes, data erases, and background operations like garbage collection, map updates, and error correction. Such queue 286 activity is choreographed by the local controller 288 to deliver prior promised data read performance consistently throughout the term of the DW interval. However, the manipulation of queued tasks 290 to execute in a sequence that is different than the order in which the respective tasks 290 were received, or generated, can create operational difficulties during the DW interval as well as during subsequent NDW intervals.

As a non-limiting example, a first data read task 292 can be initially executed based on being the first data read in the queue 286, a second task 294 can involve an error/fault during attempted execution to the die set 282, a third task 296 is executed after the second task 294 reaches a time threshold, and a fourth non-read task 298 is moved to prioritize future read tasks. In such an example, the consistency of read task execution, performance of the DW interval, and retrieval of tasks 290 that time out or experience an error is jeopardized due to the extra processing time, and power, used to prioritize read tasks, evaluate an error in execution of the second task 294, and move the fourth task 298. Hence, it is noted that despite sophisticated DW interval scheduling, performance during a DW interval can be at risk when reacting to queued tasks 290.

Figure 14:
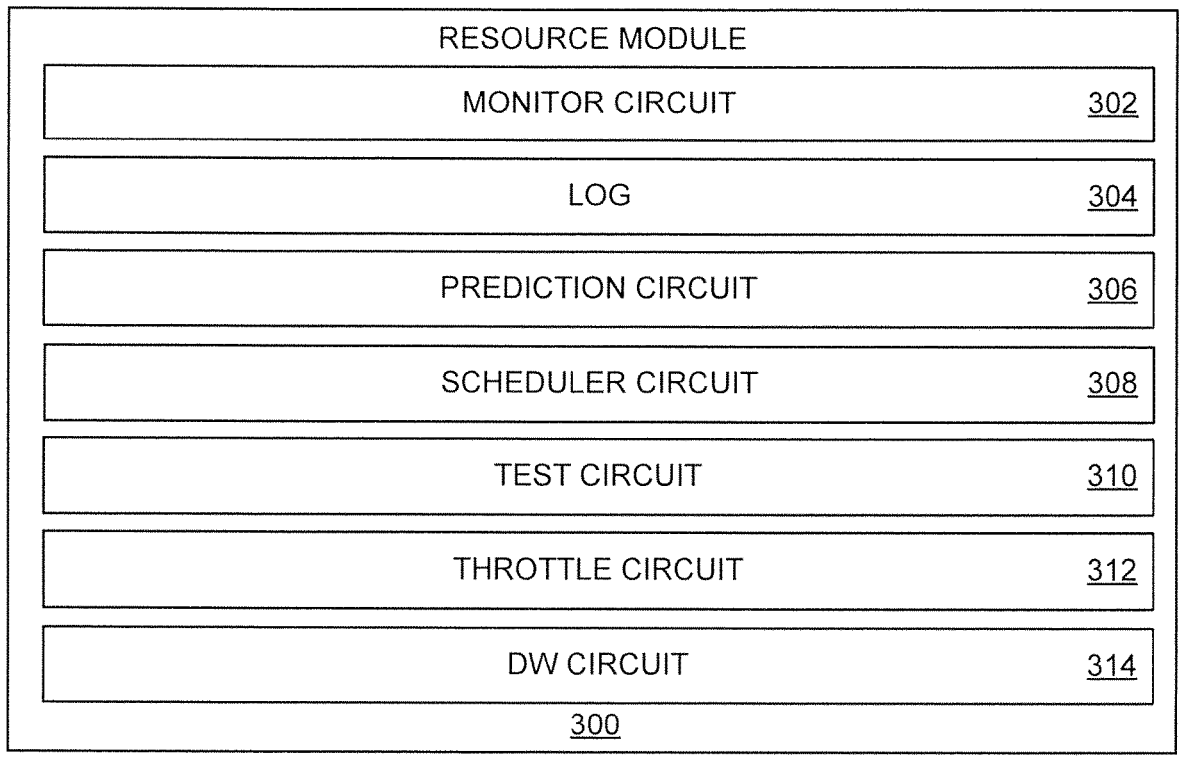
FIG. 14 shows an example resource module capable of being used in a data storage system in accordance with some embodiments.

Accordingly, various embodiments are directed to proactively handling queued tasks 290 by tracking the resources employed to execute past tasks and applying predictive machine learning to forecast how long a pending task 290 will take. The ability to accurately forecast performance metrics of pending tasks 290 allows a system controller 288 to intelligently schedule, and/or execute, tasks 290 to provide the greatest reliability of consistent read access performance during DW intervals. FIG. 14 conveys a block representation of an example resource module 300 that can be utilized in a data storage system in accordance with some embodiments to track performance metrics of executed tasks and accurately forecast the performance of future task execution.

Although not required or limiting, the resource module 300 can utilize a controller 302, such as a microprocessor or programmable circuitry generally represented by controller 288 of FIG. 13, to direct activity of various circuitry. For instance, real-time task performance metrics, such as latency, error rate, overall time to service a host request, number of background operations triggered, overall queue input-output frequency, and deterministic window interval activation, with a monitor circuit 302. The monitor circuit 302 may maintain a log 304 of sensed activity in local memory in order to allow a prediction circuit 306 of the module 300 to identify patterns and consequential data access tasks.

The prediction circuit 306 can utilize model data from other data storage systems and/or past logged activity from the present system to predict what tasks are likely to arrive in a queue as well as how long each task will take to execute in view of the present system conditions. The prediction circuit 306 can employ machine learning to improve the accuracy of forecasted background operations, read accesses, and write accessed, as well as the performance of those forecasted tasks, based on real-time tracked executions from the monitor circuit 302. It is contemplated the prediction circuit 306 can generate an accuracy value for forecasted tasks, and/or forecasted performance, and only provide those predictions that are above a predetermined accuracy threshold, such as 90% confidence.

The ability to predict future tasks and their respective execution times to a die set, with the prediction circuit 306 allows the resource module 300 to organize existing tasks so that future tasks do not inhibit or degrade consistent read access latency during deterministic window intervals. Knowledge of past executed tasks to a die set attained with the monitor circuit 302 and the accurate prediction of future pending tasks and their execution times allows a scheduler circuit 308 of the resource module 300 to customize existing queued tasks to optimize future data storage system operation. Queue customization is not limited to a particular action, but is contemplated that the scheduler circuit 308 correlates certain tasks to available system processing bandwidth, prioritizes the longest tasks to execute, prioritizes the shortest tasks to execute, and/or generates background operations out-of-turn.

At any time, the resource module 300 can utilize a test circuit 310 to carry out one or more data access operations to at least one portion of a die set to collect operational data that can increase the accuracy and speed of the monitor 302 and prediction 306 circuits. That is, one or more test patterns of data reads and/or data writes can be conducted with the test circuit 310 to verify measurements by the monitor circuit 302, test for un-monitored performance characteristics, such as memory cell settling, write amplification, or environmental conditions, and measure the data access performance of less than all of a die set.

As a result of real-time measurements, predictions, or tests, the execution performance of queued tasks may be higher, or lower, than expected. A throttle circuit 312 can resolve such issues by altering a queued task to manipulate the task's execution performance. For instance, the throttle circuit 312 may split a task into two separately executed tasks, utilize less than all available system resources to execute a task, or deliberately delay a task during execution to control when a task completes. Such control of queued task execution performance can be particularly emphasized during DW intervals. Accordingly, the resource module 300 has a DW circuit 314 that can operate alone, and other circuits, to choose and/or manipulate pending die set tasks to ensure optimal data read consistency throughout the guaranteed interval time period.

Figure 15:
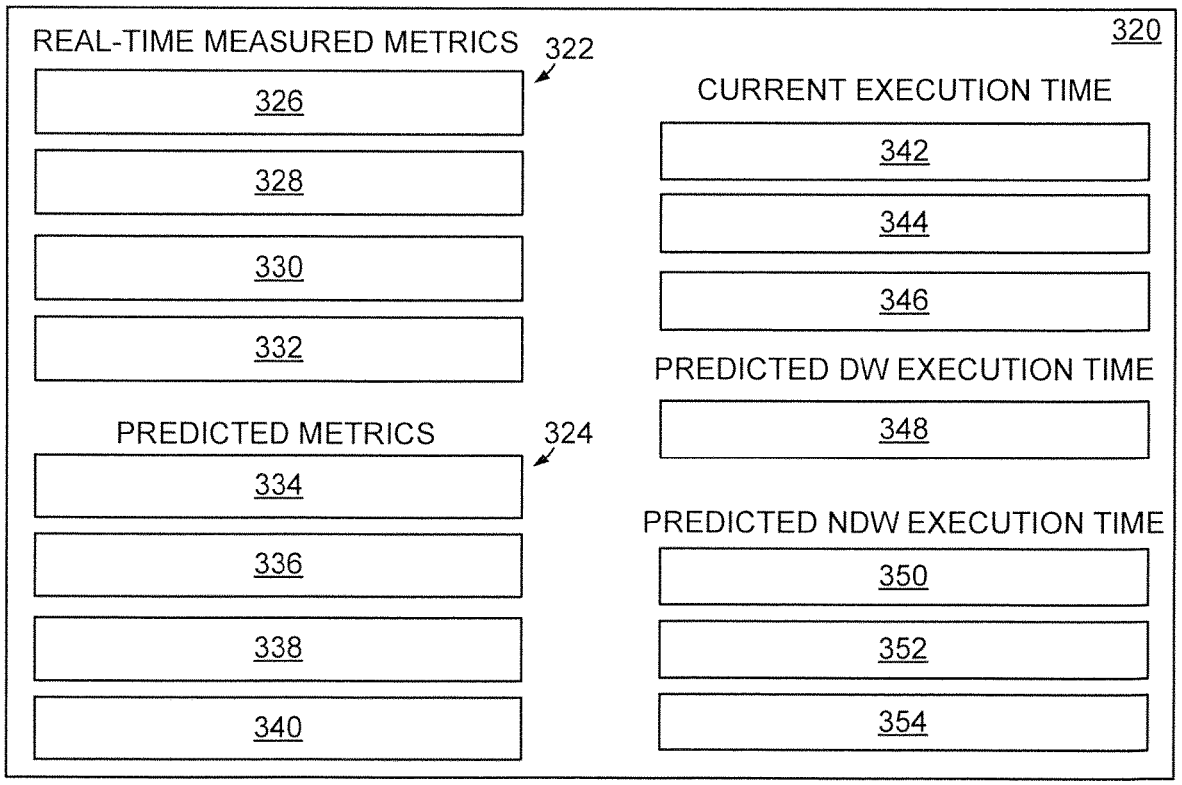
FIG. 15 conveys portions of an example data storage system optimized in accordance with assorted embodiments.

Some embodiments contemplate a single resource module 300 handling a variety of different die sets, queues, and host commands while other embodiments may use multiple different resource modules 300 in a data storage system. Regardless of the number of resource modules 300, or constituent circuitry, a data storage system controller may maintain a resource management dashboard that compiles the real-time and predicted calculations of each resource module to provide various execution time estimations. FIG. 15 provides a block representation of an example resource dashboard 320 configured in accordance with various embodiments. It is noted that the dashboard 320 is merely exemplary and in no way limits the possible information compiled by a data storage system controller.

The example dashboard 320 has several different real-time metrics 322 measured by at least one monitor circuit 302 and several different predicted metrics 324 forecasted by at least one prediction circuit 306. The real-time metrics 322 may be average latency 326 (read and/or write), error rate 328, read-write ratio 330, and I/O frequency 332 while the predicted metrics 324 may be read time to host 334, write request completion time 336, number of future background operations 338, and average read latency 340. Other real-time 322 and/or predicted 324 metrics can be computed by a system controller that are displayed, or not displayed, on the dashboard 320.

Regardless of whether computed metrics are shown on the dashboard 320, the metrics allow for real-time operational information to be calculated and displayed. For instance, real-time execution times for read requests 342, write requests 344, and background operations 346 can represent current, measured access to some, or all, of a data storage system. The displayed execution times 342/344/346 may be statistics for a single data access operation or an average of multiple accesses, such as the immediate past ten data reads, data writes, or background operations.

The computation of real-time 322 and predicted 324 metrics allows a prediction circuit to forecast the execution time in various hypothetical system conditions. As a non-limiting example, a controller can compute a single, or average, read access request execution time 348 while in DW interval conditions and single, or average, execution times to complete a read 350, write 352, or background operation 354 during NDW interval conditions.

The various predicted DW and NDW data access execution times can allow a scheduler circuit to intelligently choose which queued data access operations to execute in order to prepare a die set for more consistent DW interval performance. Such execution selection may involve reorganizing queued data access commands or changing the queue execution order without rewriting the queue. The ability to predict execution times for data accesses based on actual, detected operations to a die set allows the dashboard to be highly accurate and precise, which corresponds with optimized deterministic I/O for one or more die sets of a data storage system.

Figure 16:
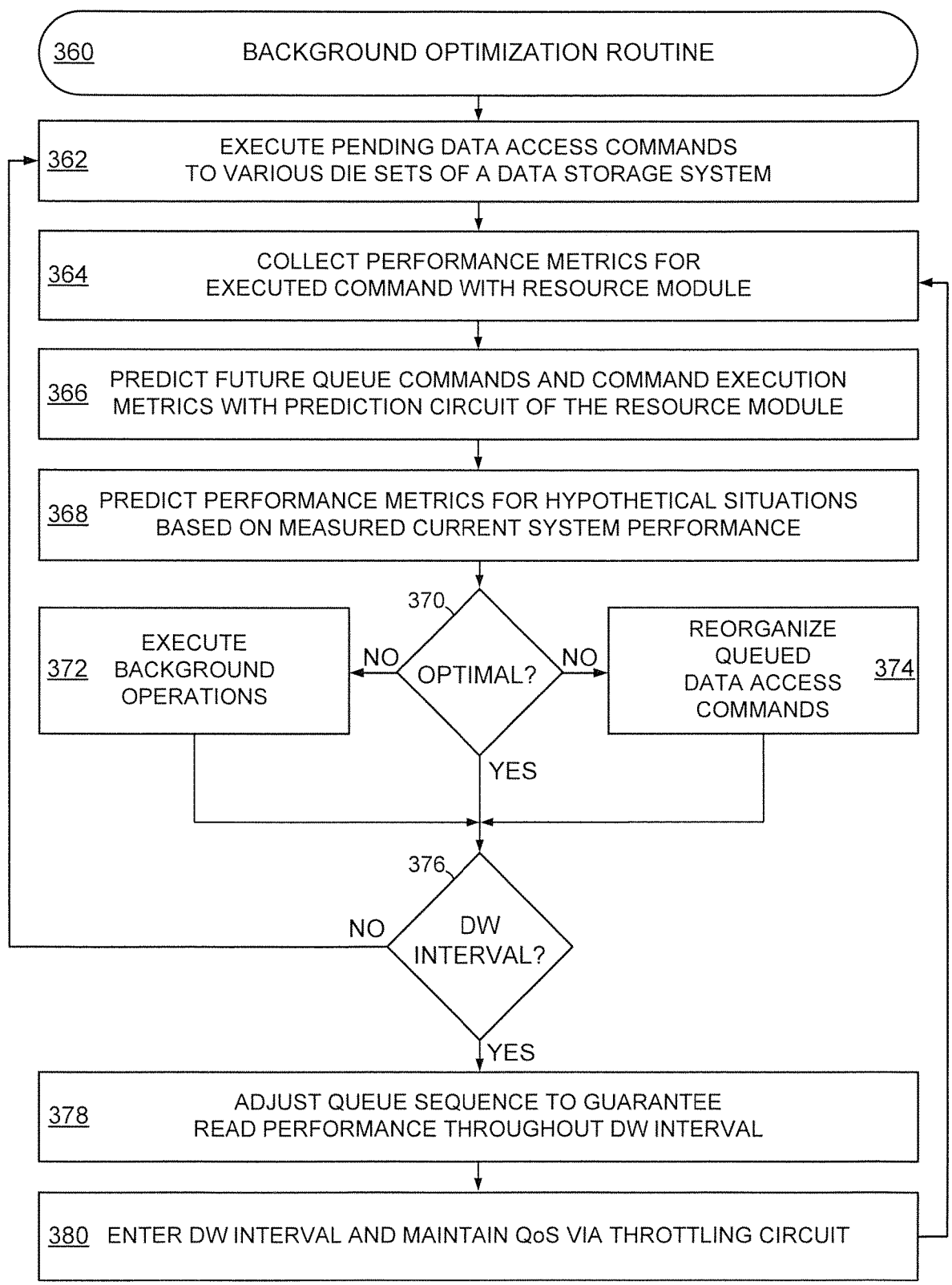
FIG. 16 is an example deterministic I/O routine that can be carried out with the respective embodiments of FIGS. 1-15.

FIG. 16 is a flowchart of an example deterministic I/O routine 360 that can be carried out with the assorted embodiments conveyed in FIGS. 1-14. With one or more die sets connected to at least one host via at least one queue and a local controller, step 362 can execute any number of data access commands, such as reads and writes requested by a remote host or background operations triggered by executed reads and/or writes. Step 364 then collects performance data for each executed command and computes real-time metrics, some of which can be displayed in a dashboard. Such real-time metrics may be, but are not limited to, time to completion, error rate, command frequency, physical accessed location, and average command queue pendency.

The detected command execution performance metrics from step 364 can be used in step 366 by a prediction circuit to predict future commands as well as the performance metrics for existing, and forecasted, commands. That is, step 366 can predict what commands will populate a die set queue and predict how long those forecasted commands will take to execute given current conditions and measured command performance metrics from step 364. A prediction circuit can also predict data access operation performance metrics for a variety of different hypothetic situations. For example, step 368 can predict one or more performance metrics, such as latency and overall time to service a command, that can be guaranteed in future time frames, such as the next minute, hour, or day. As such, step 368 can utilize predictions of the commands that will be received by a die set queue as well as the execution performance of those commands to guarantee command execution within a predetermined reliability and accuracy range.

It is contemplated that step 368 predicts guaranteed command performance metrics for possible DW interval and NDW interval conditions. The ability to predict future conditions, commands, and command execution performance based on tracked command execution performance to a die set allows decision 370 to determine if current queue command execution is optimal for the future. If a local controller determines the current queue organization, and/or queue execution order, is not optimal, the controller can choose to perform one or more background operations in step 372 that are already pending, or are proactively generated by the controller to increase future command execution performance. In other words, the controller can generate new background operations to execute or choose to execute pending background operations, or other commands that have longer than average execution times, out of queued order in order to manipulate future command execution performance.

Step 372 may be carried out alone or in combination with step 374 that re-writes a die set queue to reorganize the constituent pending commands. Such queue reorganization can correspond with prioritizing certain pending commands in a manner customized for current system command execution performance, such as executing longer commands first, longer commands last, data writes first, data writes last, or interleaving data reads and data writes. It is noted that step 374 may be executed alone and without step 372. It is noted that the reorganization of pending commands in step 374 may correspond with degraded short-term system performance in order to optimize long-term, or interval specific, command execution performance.

In the event the current queue command organization is determined to be optimal in decision 370, or at the conclusion of steps 372 and/or 374, decision 376 evaluates if a die set is in a pending, or current, DW interval. If so, step 378 is activated to adjust the die set queue in accordance with the DW interval command execution sequence predicted to be optimal in step 368 to provide at least consistent data read performance throughout the DW interval in step 380. It is contemplated that step 380 involves reducing the read performance of a die set during the DW interval via a throttling circuit in order to maintain a consistent read performance. If the die set is not in an immediate DW interval in decision 376, the routine 360 returns to step 362 where die set operation is tracked to allow for future data storage system optimization.

Through the various embodiments of a data storage system, one or more logical die sets can be optimized with a resource module tracking command execution performance metrics. The utilization of the tracked execution performance metrics to predict future read, write, and background operation execution performance allows the resource module to intelligently choose and execute pending die set access commands out of queued order to optimize current and/or future performance. The ability to employ current command execution performance to predict both DW and NDW interval performance allows for current command execution that results in future performance improvements.

What is claimed is:

1. A method comprising:
   measuring a performance metric of execution of a first data access command to a die set of a semiconductor memory;
   populating a queue with multiple different data access commands organized into a first execution sequence, each data access command of the queue assigned to the die set;
   predicting a background operation command that will be received by the queue and an overall time to service the background operation command guaranteed for a future time frame on the die set;
   determining the first execution sequence is not optimal to guarantee a read access latency consistency within a range during a deterministic window based on the predicted overall time to service the predicted background operation command;
   determining a read access latency that can be guaranteed for the deterministic window within the range with the greatest consistency based on the predicted overall time to service the predicted background operation command; and
   executing a background operation on the die set to guarantee the read access latency with the greatest consistency within the range during the deterministic window interval.

2. The method of claim 1, wherein the semiconductor memory comprises a plurality of different die sets.

3. The method of claim 1, wherein the multiple data access commands comprise at least one data read, at least one data write, and at least one background operation.

4. The method of claim 1, wherein the queue is populated by requests from a remote host.

5. The method of claim 1, wherein a first execution time of the second execution sequence is slower than a second execution time of the first execution sequence.

6. The method of claim 1, wherein the measured performance metric is a total time to execute the data access command.

7. The method of claim 1, wherein the multiple different data access commands of the queue are executed in a second execution sequence to reduce a future execution time of at least two data access commands.

8. The method of claim 7, wherein the second execution sequence is executed to maintain a nominally consistent data read reliability and accuracy performance within the range throughout the deterministic window interval.

9. The method of claim 7, wherein the second execution sequence is executed during a non-deterministic window interval.

10. A method comprising:
    measuring a performance metric of execution of a first data access command to a die set of a semiconductor memory;
    populating a queue with multiple different data access commands organized into a first execution sequence, each data access command of the queue assigned to the die set;
    predicting a future data access command and background operation command will each populate the queue along with predicting an overall time to service the background operation command guaranteed for a future time frame on the die set;
    determining the first execution sequence is not optimal to guarantee a greatest possible read access latency consistency within a range during a deterministic window based on the predicted overall time to service the predicted background operation command;
    generating a background operation to proactively provide a greatest possible read access latency consistency during the deterministic window in response to the first execution sequence not being optimal at guaranteeing a read access latency consistency to the die set within a range during the deterministic window;
    executing the background operation on the die set; and
    reorganizing the multiple different data access commands of the queue in a second execution sequence to guarantee future read access latency to the die set at the greatest possible consistency within the range during the deterministic window.

11. The method of claim 10, wherein the future data access command prediction is conducted by a prediction circuit of a resource module connected to the die set and queue.

12. The method of claim 11, wherein the prediction circuit predicts a future execution time of the future data access command.

13. The method of claim 10, wherein the queue is reorganized from the first execution sequence into the second execution sequence after the future data access command is predicted.

14. The method of claim 10, wherein the multiple different data access commands of the queue remain in an order in which the data access commands are received during the execution of the second execution sequence.

15. The method of claim 10, wherein the multiple different data access commands of the queue in a second execution sequence are throttled in response to real-time execution of the data access commands not providing the greatest possible read access latency consistency during the deterministic window.

16. The method of claim 15, wherein the second execution sequence is throttled by splitting a data access command into two separate executed tasks.

17. The method of claim 15, wherein the second execution sequence is throttled by inserting a deliberate delay during execution of a data access command.

18. The method of claim 10, wherein the performance metric is redundantly tested by a test circuit of a resource module prior to execution of the second execution sequence.

19. A system comprising a resource module connected to a die set of a semiconductor memory and to a die set queue, the resource module comprising a prediction circuit, monitor circuit, a scheduler circuit, a throttle circuit, and a deterministic window circuit, the prediction circuit to predict a background operation command that will be received by a queue and an overall time to service the background operation command guaranteed for a future time frame on the die set, the monitor circuit configured to measure a performance metric of execution of a first data access command to the die set, the deterministic window circuit configured to execute background operation on the die set in response to a determination that the first execution sequence is not optimal and cannot guarantee a greatest possible read access latency consistency within a range during a deterministic window based on the predicted overall time to service the background operation command, the scheduler circuit configured to alter a first execution sequence of data access commands to the die set to a second execution sequence in response to the measured performance metric and determination that the first execution sequence is not optimal to guarantee the greatest possible read access latency consistency within the range during the deterministic window, the throttle circuit configured to alter execution of the first data access command or background operation command to provide the greatest possible read access latency consistency throughout the deterministic window.

20. The system of claim 19, wherein execution of the at least one future data access command is performed at less than an available execution capability as directed by the throttle circuit of the resource module to maintain the best possible read access latency consistency during the deterministic window.

* * * * *